United States Patent
Treat et al.

(10) Patent No.: US 10,442,524 B1
(45) Date of Patent: Oct. 15, 2019

(54) WIND ENERGY KITE TAIL

(71) Applicant: Makani Technologies LLC, Alameda, CA (US)

(72) Inventors: Nathan Treat, Alameda, CA (US); Jérôme Sicard, Oakland, CA (US); Campbell McLaren, Alameda, CA (US); Thomas Van Alsenoy, Alameda, CA (US)

(73) Assignee: Makani Technologies LLC, Alameda, CA (US)

( * ) Notice: Subject to any disclaimer, the term of this patent is extended or adjusted under 35 U.S.C. 154(b) by 420 days.

(21) Appl. No.: 15/435,471

(22) Filed: Feb. 17, 2017

(51) Int. Cl.
| | |
|---|---|
| *B64C 9/00* | (2006.01) |
| *B64C 39/02* | (2006.01) |
| *F03D 5/00* | (2006.01) |
| *B64C 5/06* | (2006.01) |
| *B64C 5/02* | (2006.01) |

(52) U.S. Cl.
CPC ............. *B64C 9/00* (2013.01); *B64C 5/02* (2013.01); *B64C 5/06* (2013.01); *B64C 39/022* (2013.01); *F03D 5/00* (2013.01); *F05B 2240/923* (2013.01)

(58) Field of Classification Search
CPC ..... B64F 3/02; B64C 9/00; B64C 9/02; B64C 5/02; B64C 5/06; B64C 39/022; B64C 2201/06; B64C 2201/148; B64C 2201/104; B64C 2201/108; F03D 5/00
See application file for complete search history.

(56) References Cited

U.S. PATENT DOCUMENTS

| | | | |
|---|---|---|---|
| D508,094 S * | 8/2005 | Khasminsky | D12/345 |
| 8,939,810 B1 * | 1/2015 | Suknanan | A63H 27/02 446/34 |
| 9,246,433 B2 | 1/2016 | Goldstein | |
| 9,352,832 B2 * | 5/2016 | Vander Lind | B64C 31/06 |
| 9,630,711 B2 * | 4/2017 | Vander Lind | B64C 31/06 |
| 9,764,820 B2 * | 9/2017 | Kinne | F03D 5/00 |
| 9,902,489 B2 * | 2/2018 | Fisher | B64C 39/024 |
| D831,124 S * | 10/2018 | Treat | D21/445 |
| 10,227,129 B2 * | 3/2019 | Fisher | B64C 39/024 |
| 2011/0260462 A1 * | 10/2011 | Vander Lind | A63H 27/002 290/55 |

(Continued)

FOREIGN PATENT DOCUMENTS

| | | |
|---|---|---|
| WO | 2007/051034 | 5/2007 |
| WO | 2011/119876 | 9/2011 |

*Primary Examiner* — Philip J Bonzell
(74) *Attorney, Agent, or Firm* — McDonnell Boehnen Hulbert & Berghoff

(57) ABSTRACT

The present disclosure relates to an aerial vehicle with a horizontal tailplane disposed along a bottom edge of a vertical tailfin. Namely, the aerial vehicle includes an empennage attached to the fuselage via a tail boom and a tail coupling. The empennage includes a vertical tailfin that extends below the tail coupling. The empennage also includes a tube arranged along a leading edge of the vertical tailfin and below the tail coupling of the aerial vehicle. The empennage additionally includes one or more rotating actuators and a horizontal tailplane. The horizontal tailplane is coupled to the tail via the tube and includes a continuous leading edge and a cutout. The one or more rotating actuators are configured rotate the horizontal tailplane about an axis of the tube. At least a portion of the vertical tailfin is configured to pass through the cutout.

20 Claims, 12 Drawing Sheets

Perspective Front Left Above

(56) References Cited

U.S. PATENT DOCUMENTS

| | | | |
|---|---|---|---|
| 2014/0312169 A1* | 10/2014 | Fisher | B64C 39/024 244/89 |
| 2015/0097071 A1 | 4/2015 | Frolov et al. | |
| 2015/0375847 A1* | 12/2015 | Kinne | F03D 5/00 244/48 |
| 2016/0207626 A1 | 7/2016 | Bailey | |
| 2016/0318609 A1 | 11/2016 | Lynn et al. | |
| 2017/0113778 A1* | 4/2017 | Liu | B64C 39/024 |
| 2018/0222570 A1* | 8/2018 | Fisher | B64C 39/024 |
| 2019/0161163 A1* | 5/2019 | Fisher | B64C 5/02 |

* cited by examiner

Perspective Rear Right Above

Top View

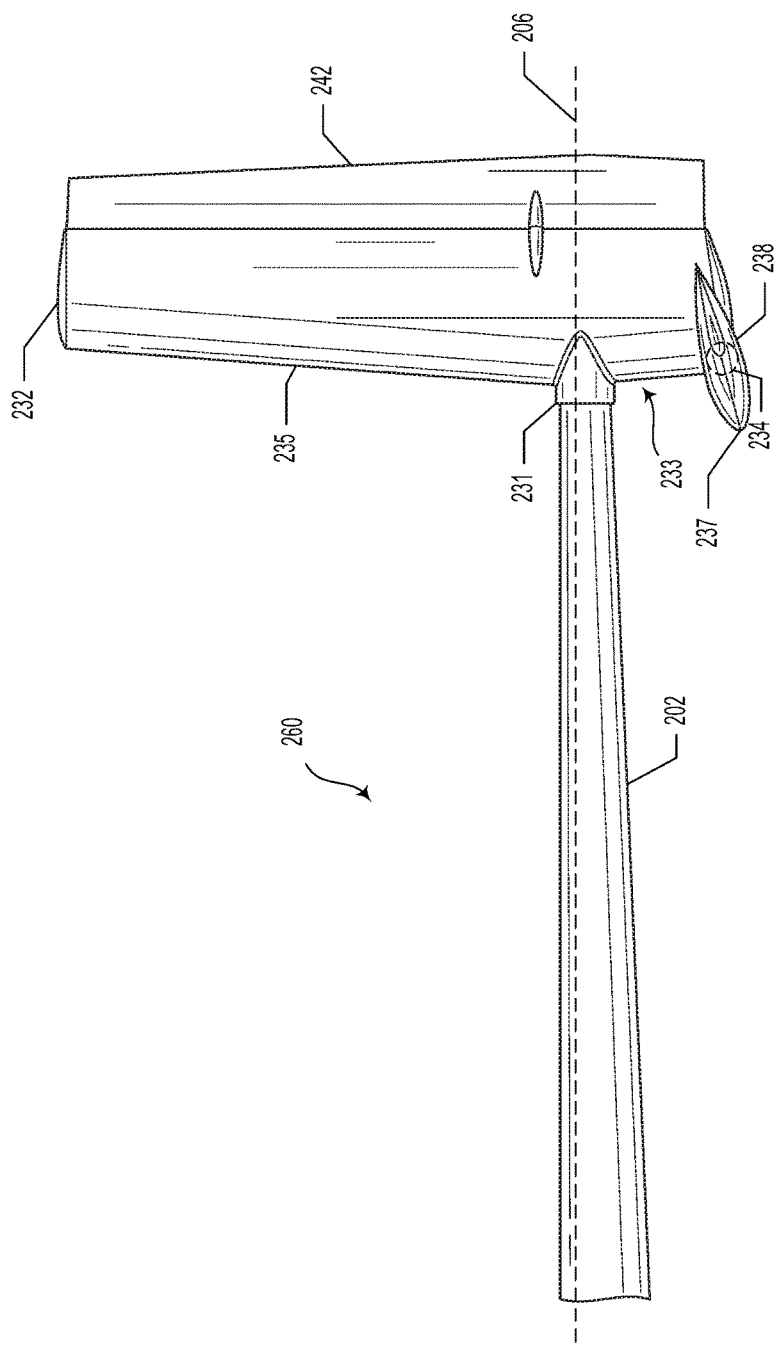
Figure 2F  Left Side View – Alternative Configuration 1

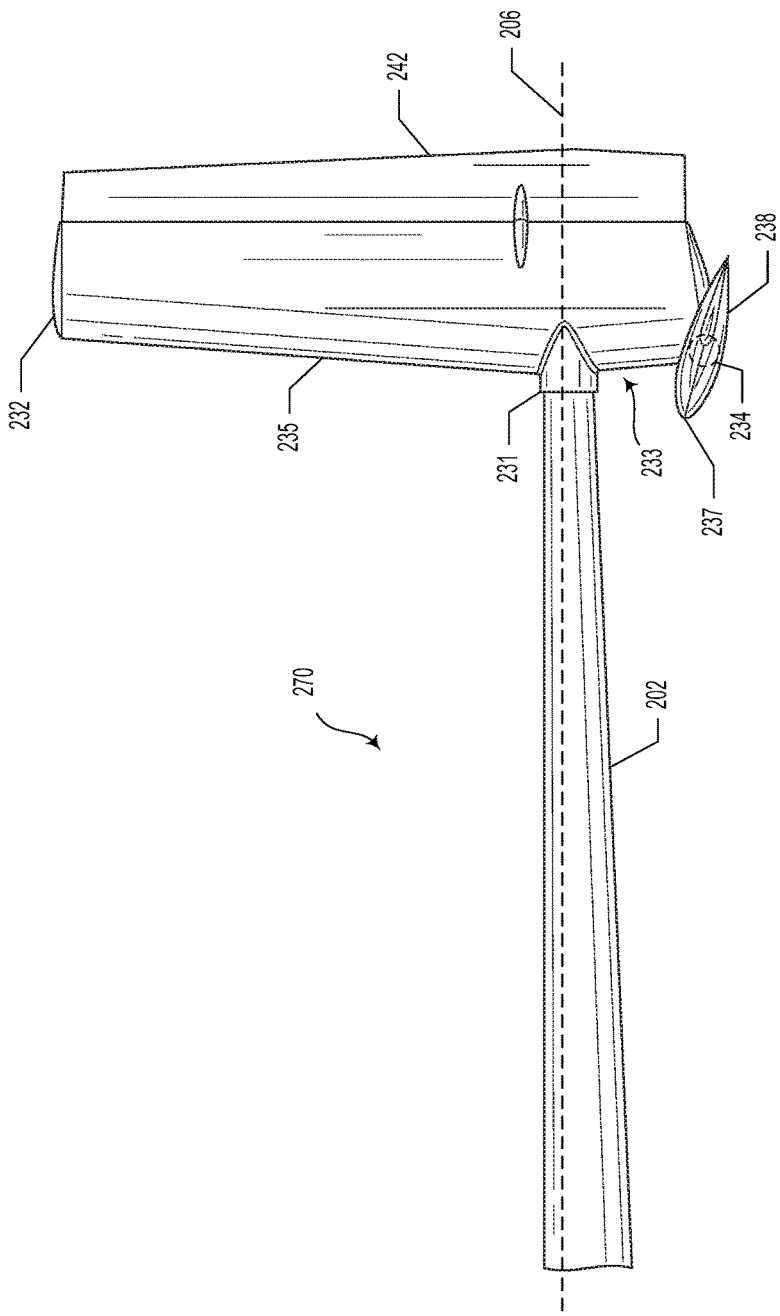
Figure 2G — Left Side View – Alternative Configuration 2

Left Side View

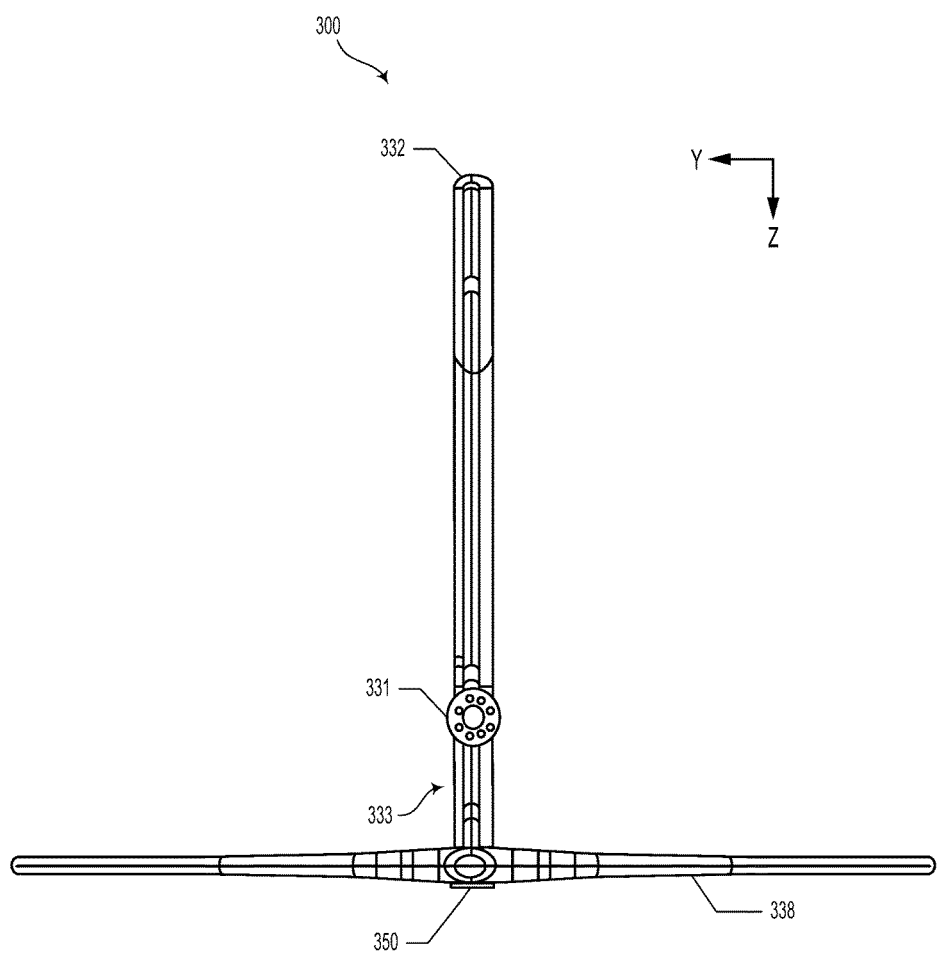
Figure 3B  Front View

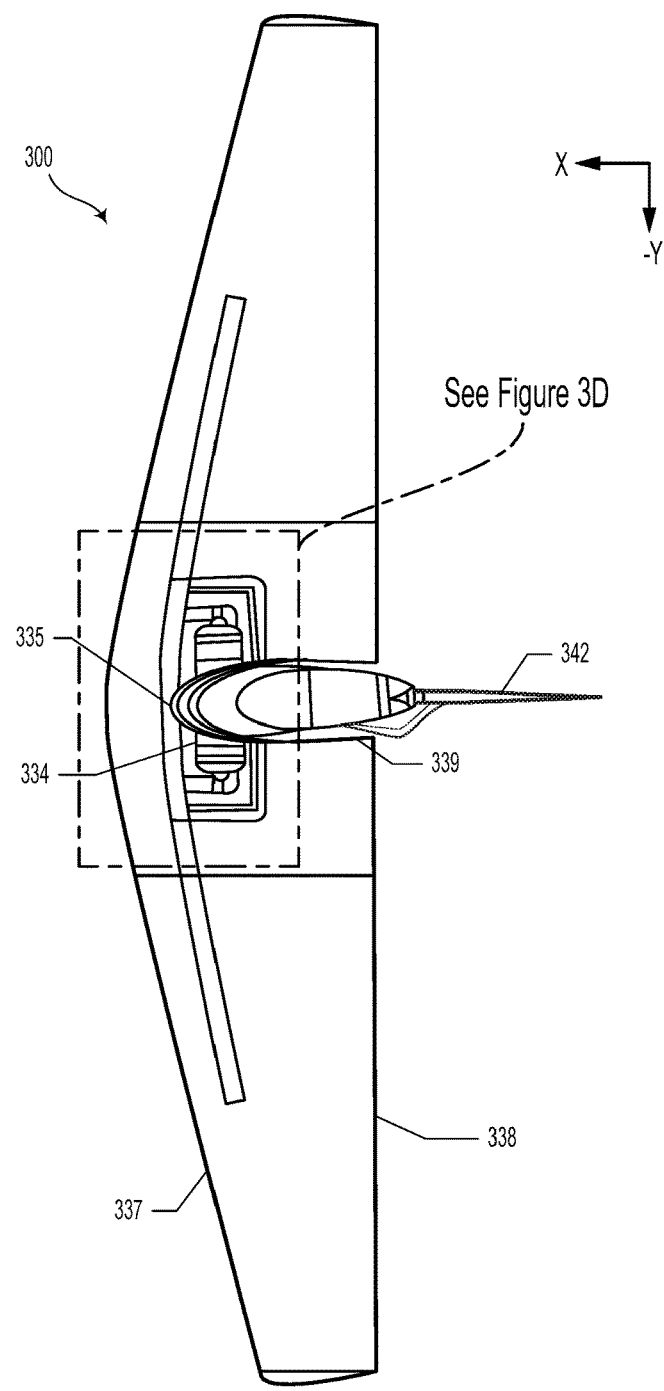
Figure 3C  Top View

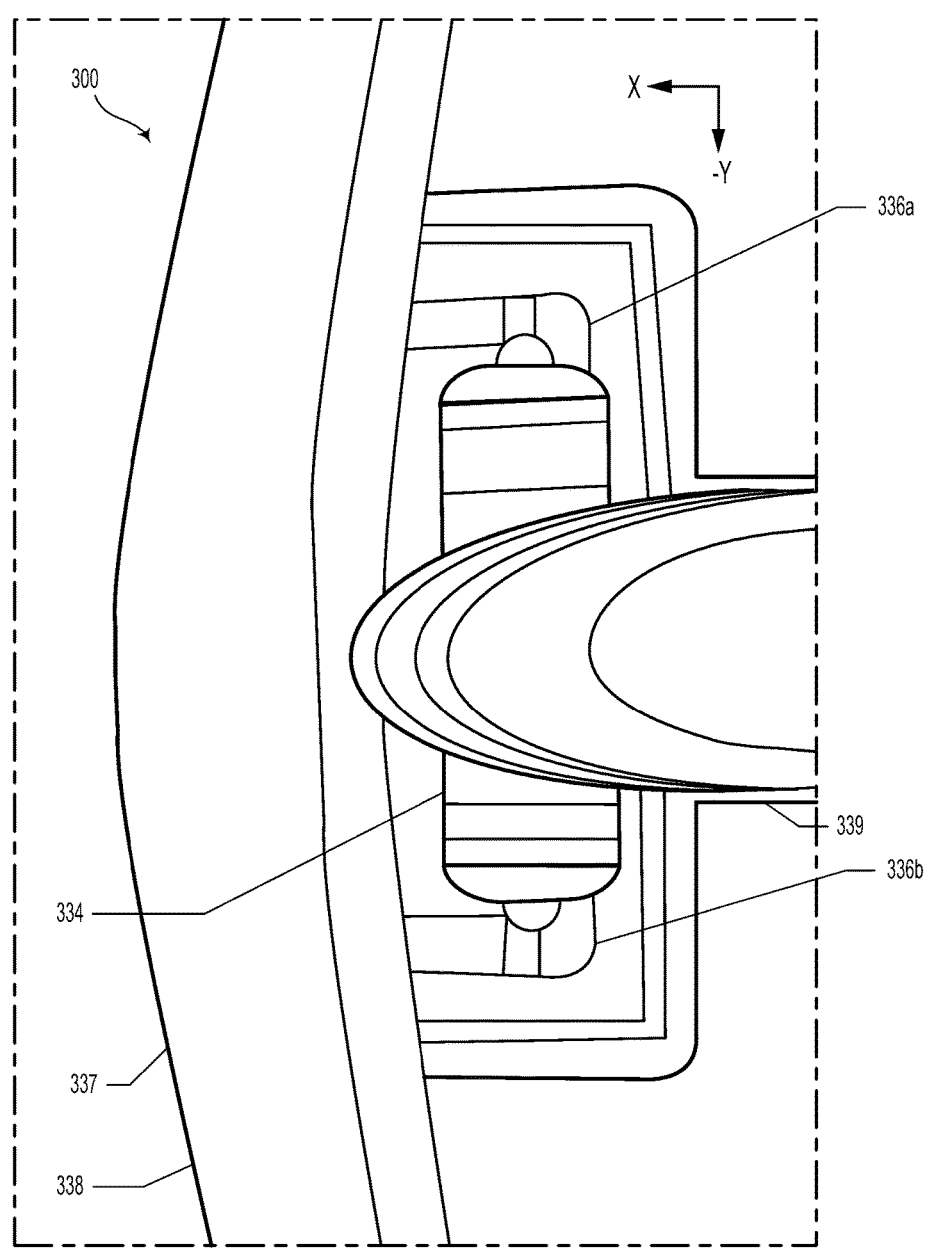
Figure 3D  Top Detail View

WIND ENERGY KITE TAIL

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

Some wind energy systems include an aerial vehicle configured to generate electrical power while in flight. Such aerial vehicles may include a main wing, a body, and a tail portion, or empennage.

SUMMARY

The present disclosure generally relates to aerial vehicle systems and methods that include various arrangements of tailplanes. Some such aerial vehicle systems may extract useful power from the wind for various purposes such as, for example, generating electricity, lifting or towing objects or vehicles, etc. Beneficially, embodiments described herein may provide better flight and/or power generation performance in aerial vehicle energy kite systems.

In an aspect, a system is provided. The system includes a ground station, a tether, and an aerial vehicle. The aerial vehicle is coupled to the ground station via the tether. The aerial vehicle includes a fuselage and a main wing attached to the fuselage. The aerial vehicle also includes a plurality of motors. The motors are attached to the main wing. The motors are mechanically coupled to respective propellers. The aerial vehicle includes an empennage attached to the fuselage via a tail coupling. The empennage includes a vertical tailfin. At least a portion of the vertical tailfin extends below the tail coupling. The empennage also includes a tube, which may be termed a yoke, arranged along a leading edge of the vertical tailfin and below the tail coupling. The empennage further includes one or more rotating actuators and a horizontal tailplane. The horizontal tailplane includes a continuous leading edge and a cutout. The horizontal tailplane is coupled to the empennage via the tube. The one or more rotating actuators are configured to rotate the horizontal tailplane about an axis of the tube. The cutout includes an open slot in the horizontal tailplane. At least a portion of the vertical tailfin is configured to pass through the cutout. The system also includes a tether. The aerial vehicle is coupled to the ground station via the tether.

In a further aspect, an aerial vehicle is provided. The aerial vehicle includes a fuselage and a main wing attached to the fuselage. The aerial vehicle also includes a plurality of motors. The motors are attached to the main wing. The motors are mechanically coupled to respective propellers. The aerial vehicle includes an empennage attached to the fuselage via a tail coupling. The empennage includes a vertical tailfin. At least a portion of the vertical tailfin extends below the tail coupling. The empennage also includes a tube arranged along a leading edge of the vertical tailfin and below the tail coupling. The tube includes a plurality of bonded carbon fiber sheets. The empennage includes one or more rotating actuators and a horizontal tailplane. The horizontal tailplane includes a continuous leading edge and a cutout. The horizontal tailplane is coupled to the tail via the tube. The one or more rotating actuators are configured to rotate the horizontal tailplane about an axis of the tube. The cutout includes an open slot in the horizontal tailplane and at least a portion of the vertical tailfin is configured to pass through the cutout.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 2F illustrates a tail portion, according to an example embodiment.

FIG. 2G illustrates a tail portion, according to an example embodiment.

FIG. 3B illustrates a tail portion, according to an example embodiment.

FIG. 3C illustrates a tail portion, according to an example embodiment.

FIG. 3D illustrates a tail portion, according to an example embodiment.

DETAILED DESCRIPTION

Figure 1:
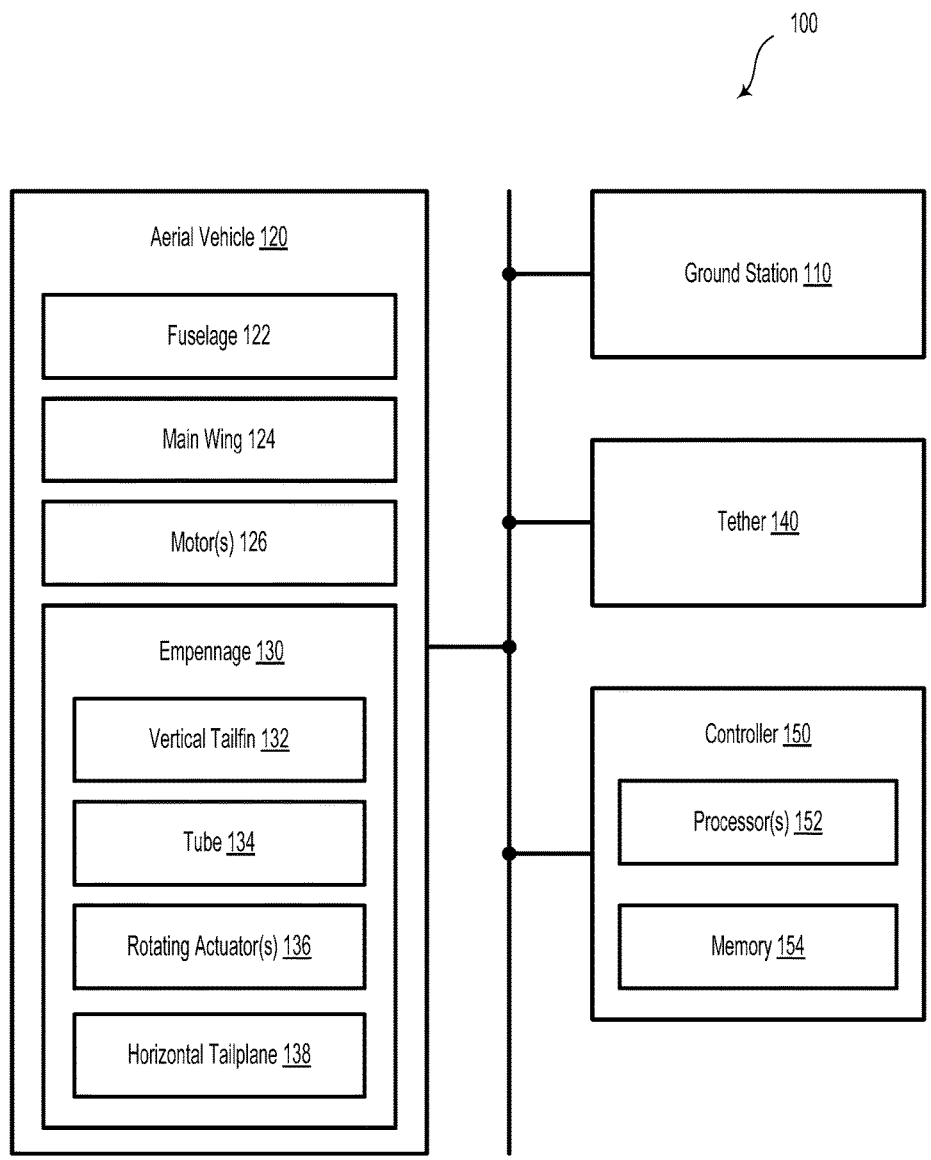
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A wind energy kite may be an aerial vehicle configured to generate electrical power while in a crosswind flight mode. In an embodiment, the kite may be tethered to a ground station or another type of anchor or mooring. The kite may be configured to take off from and land at the ground station or another physical location. The kite may include one or more motors coupled to corresponding propellers, a main wing, a fuselage or body, a tail boom, and a tail portion (e.g., an empennage). In some embodiments, the kite may include at least eight motors. In such a scenario, half of the motors (e.g., upper motors) may be located on wing pylons coupled to the main wing and arranged above a chord of the main wing. The other half of the motors (e.g., lower motors) may be located on wing pylons coupled to the main wing and arranged below the chord of the main wing.

The empennage may be connected to a main wing and/or fuselage via the tail boom. The empennage may include one or more vertical tailfins (e.g., a vertical stabilizer and rudder) and a tailplane (e.g., a horizontal stabilizer and elevator or a stabilator). In example embodiments, the empennage may provide forces to help balance the aerial vehicle along its vertical and lateral axes (e.g., provide passive stability). Furthermore, the empennage (e.g., the vertical tailfin and the horizontal tailplane) may provide pitch and yaw adjustments for the kite while in flight. The empennage may include a tail coupling configured to accept an end portion of the tail boom. At least a portion of the empennage may extend below the nose sleeve.

In an example embodiment, the horizontal tailplane may be directly or indirectly coupled to the empennage at a position that is below the tail coupling and/or an axis of the tail boom. Namely, the horizontal tailplane may be coupled to the empennage via a tube located near a leading edge of the vertical tailfin (e.g., a location below the tail coupling and along the leading edge of the vertical tailfin).

In some embodiments, the horizontal tailplane may be operable to rotate about a pivot axis that passes through the tube. The horizontal tailplane may be arranged such that the pivot axis is behind a leading edge of the horizontal tailplane. In some embodiments, one or more servo motors may be operable to rotate the horizontal tailplane about the adjustment axis. In an example embodiment, the horizontal tailplane may be a stabilator control surface. In such scenarios, the horizontal tailplane may include a cutout so the horizontal tailplane may be oriented downward. In such orientations, the cutout may provide an opening for at least a portion of the vertical tailfin to pass unimpeded. In some embodiments, the cutout may include an opening along the centerline of the horizontal tailplane from where the horizontal tailplane couples to the tube and aft of that point. That is, the cutout may be positioned as a notch in a trailing edge of the horizontal tailplane. For example, a top view of the cutout in the horizontal tailplane may resemble a "T". That is, a top portion of the "T" may accommodate the tube and an aft portion of the "T" may provide an opening through which the vertical tailfin may pass. In other words, the horizontal tailplane may be shaped so as to surround a portion of the vertical tailfin, with a leading edge in front of, and a port and a starboard portion that extend behind, the vertical tailfin.

In such embodiments, a leading edge of the horizontal tailplane may include a continuous (e.g., smooth and/or unbroken) edge/surface.

Additionally or alternatively, the horizontal tailplane may have a split surface that could include a port and starboard portion. For example, the port and starboard portions may be separately controlled and/or rotated about the tube. That is, a port portion of the horizontal tailplane may have a first orientation with respect to the tube and the starboard portion of the horizontal tailplane may have a second orientation with respect to the tube.

Various aspects of the horizontal tailplane, such as the continuous leading edge, the cutout, and the ability for the horizontal tailplane to be adjusted about the adjustment axis within a wide range may provide improved flight control and other performance aspects of the kite. In some embodiments, arranging the horizontal tailplane as described herein may increase the flight speed at which the horizontal tailplane may experience aerodynamic flutter. That is, by placing the horizontal tailplane close to the tail coupling or below an axis of the tail boom, high speed stability of the aerial vehicle may be improved. In an example embodiment, adjusting a position of the horizontal tailplane to a front bottom position along the vertical tailfin may increase the flutter onset speed from 66 meters per second to nearly 100 m/s.

Additionally or alternatively, the horizontal tailplane arrangement described herein may provide a lowered center of gravity (as opposed to a T-tail horizontal stabilizer placement). Such an arrangement may provide better thrust balance between the upper motors and the lower motors.

Yet further, the horizontal tailplane arrangement described herein may substantially remove the horizontal tailplane from propeller wash during hover flight in edgewise wind. That is, while the aerial vehicle is hovering in edgewise wind, propeller wash does not substantially interact with the horizontal tailplane. By removing the horizontal tailplane from the propeller wash, the aerial vehicle may be more stable and/or easier to control in hover flight mode. The reduction of oscillatory force cycles caused by the propeller wash could also increase the service life of the empennage.

II. Example Systems

FIG. 1 illustrates a system 100, according to an example embodiment. System 100 includes a ground station 110, an aerial vehicle 120, and a tether 140.

The aerial vehicle 120 may include or take the form of various types of devices, such as a kite, a helicopter, a wing and/or an airplane, among other possibilities. The aerial vehicle 120 may be formed of structures including metal, plastic, carbon fiber, and/or other polymers. The aerial vehicle 120 may be formed of any material which allows for a high thrust-to-weight ratio and generation of electrical energy which may be used in utility applications. Additionally, the materials may be chosen to allow for a lightning hardened, redundant, and/or fault tolerant design which may be capable of handling large and/or sudden shifts in wind speed and wind direction. Other materials may be possible as well.

The aerial vehicle 120 includes a fuselage 122 and a main wing 124 attached to the fuselage 122. The aerial vehicle 120 also includes a plurality of motors 126. The motors 126 are attached to the main wing 124. The motors 126 are mechanically coupled to respective propellers.

The aerial vehicle 120 includes an empennage 130 attached to the fuselage via a tail boom and a tail coupling. The empennage 130 includes a vertical tailfin 132 and at least a portion of the vertical tailfin 132 extends below the tail coupling. The vertical tailfin 132 may include a combination of control surfaces configured to provide yaw adjustments to the aerial vehicle 120. The empennage 130 also includes a tube 134 arranged along a leading edge of the vertical tailfin 132 and below the tail coupling. In some scenarios, the tube 134 is further arranged along a bottom location along the leading edge of the vertical tailfin 132, below the tail coupling, and/or below an axis of the tail boom. In some scenarios, the tube may additionally or alternatively be a mechanical yoke.

The empennage 130 includes one or more rotating actuators 136 and a horizontal tailplane 138. The horizontal tailplane 138 includes a continuous leading edge and a cutout. In some example embodiments, the horizontal tailplane 138 may be a stabilator (e.g., an all-moving horizontal control surface). Alternatively or additionally, the horizontal tailplane 138 may include an elevator portion (e.g., a trailing edge elevator control surface). Yet further, the horizontal tailplane may include at least one of a servo tab or an anti-servo tab. It is understood that the horizontal tailplane 138 may include a combination of control surfaces configured to provide pitch, yaw, roll, and/or airspeed adjustments to the aerial vehicle 120.

The horizontal tailplane 138 is coupled to the vertical tailfin 132 via the tube (or yoke) 134. The one or more rotating actuators 136 are configured to rotate the horizontal tailplane 138 about an axis of the tube 134. As an example, the axis of the tube 134 could be an axis of rotation. At least a portion of the vertical tailfin 132 is configured to pass through the cutout. In some embodiments, the cutout may include an open slot in the horizontal tailplane 138. In some embodiments, the cutout may be disposed along a centerline of the horizontal tailplane 138 and aft of the tube 134 and/or the continuous leading edge. For example, as the horizontal tailplane 138 may rotate about the tube 134 such that the trailing edge of the horizontal tailplane 138 is adjusted to be above the leading edge of the horizontal tailplane 138. In such a scenario, the cutout may provide a space through which the vertical tailfin 132 may pass to avoid contact with the horizontal tailplane 138. That is, the cutout may provide clearance for the horizontal tailplane 138 to move such that it may overlap at least a portion of the vertical tailfin 132.

In some embodiments, the horizontal tailplane 138 may include a split stabilizer having a port portion and a starboard portion. In such scenarios, the port and starboard portions may be independently rotatable about the tube 134. That is, the port portion may rotate about the tube 134 in a first direction and the starboard portion may rotate about the tube 134 in a second direction.

The tube 134 may be cylindrically shaped and may be formed from a plurality of bonded carbon fiber sheets. Additionally or alternatively, the tube 134 may include one or more different materials, such as steel, aluminum, titanium, or another material.

In some embodiments, the aerial vehicle 120 is coupled to the ground station 110 via the tether 140. The tether 140 may be constructed in any form and using any material which may allow for the transmission, delivery, and/or harnessing of electrical energy generated by the aerial vehicle 120 and/or transmission of electricity to the aerial vehicle 120. The tether 140 may also be configured to withstand one or more forces of the aerial vehicle 120 (e.g., tension and/or torsion loads) when the aerial vehicle 120 is in an operational mode.

The tether 140 may include, for example, one or more conductors that may provide a conduit between the aerial vehicle 120 and the ground station 110. In some embodiments, electrical energy generated by the aerial vehicle 120 may be conducted to the ground station 110 via the tether 140. Additionally or alternatively, the tether 140 may transmit electricity to the aerial vehicle 120 in order to power the aerial vehicle 120 for takeoff, landing, hover flight, and/or forward flight. The tether 140 may additionally or alternatively provide a communication link between the aerial vehicle 120 and the ground station 110.

In an example embodiment, the tether 140 may be configured to transmit electrical energy to an energy storage/power transmission element (e.g., a battery and/or an electrical distribution grid). That is, in an example embodiment, the tether 140 may provide electrical coupling between the aerial vehicle 120 and an electrical storage device. The energy storage/power transmission element may, for example, include an electrical storage device such as a battery or a supercapacitor. Additionally or alternatively, the energy storage/power transmission element can include an electrical conductor (a power line), a power grid, a generator, a pump, a power conversion device, or another type of electrical power element. In an example embodiment, the energy storage/power transmission element can be located on the aerial vehicle 120, at the ground station 110, or elsewhere.

The tether 140 may include two or more bridle segments, which may be coupled to various bridle attachment points on an airframe of the aerial vehicle 120 (e.g., along the main wing 124 and/or the fuselage 122). As an example, the tether 140 may include a core portion configured to withstand one or more forces of the aerial vehicle 120 when the aerial vehicle 120 is in hover flight, forward flight, and/or crosswind flight modes. The core portion of the tether 140 may be constructed of any high strength fibers (e.g., carbon fiber, carbon nanotubes, polymer fibers, or another type of structural fiber). In some examples, the tether 140 may have a fixed length and/or a variable length. For instance, in at least one such example, the tether 140 may have a length of 450 meters. Shorter or longer lengths of tether 140 are possible and contemplated.

In some embodiments, system 100 may include a controller 150. The controller 150 includes at least one processor 152 and a memory 154. The controller 150 could be located in the aerial vehicle 120 and/or could be located elsewhere (e.g., the ground station 110 or another location). The one or more processors 152 may include a general-purpose processor and/or a special-purpose processor (e.g., digital signal processors, application specific integrated circuits, field-programmable gate arrays, etc.). The one or more processors 152 may be configured to execute computer-readable program instructions that are stored in the memory 154.

The memory 154 may include or take the form of one or more computer-readable storage media that may be read or accessed by the one or more processors 152. The one or more computer-readable storage media may include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions and perhaps additional data, such as diagnostic data relating to aerial vehicle 110. The one or more processors 152 may execute the program instructions to provide at least some of the functionality and operations described herein.

For example, the operations may include causing the one or more rotating actuators 136 to rotate so as to rotate the horizontal tailplane 138 about the tube 134 based at least on an operation mode of the aerial vehicle 120. For instance, the operational mode of the aerial vehicle 120 may include one of a forward flight mode or a hover mode. Other operational modes are possible.

In some embodiments, the aerial vehicle 120 is a wind energy kite configured to generate electricity via the motors 126. In such scenarios, the respective motors 126 may be hybrid motors configured to generate electricity while the aerial vehicle 120 is operating in the forward flight mode. For example, the aerial vehicle 120 may operate in a crosswind flight mode so as to utilize wind energy to generate electrical power.

Two or more elements of system 100 may be communicatively coupled using a communication interface. The communication interface may include one or more wireless interfaces and/or one or more wired interfaces. As an example, such a communication interface may provide a communication link between the ground station 110 and the aerial vehicle 120 using one or more networks. As described herein, wireless interfaces may provide for communication under one or more wireless communication protocols, such as Wi-Fi (e.g., an IEEE 802.11 protocol), Long-Term Evolution (LTE), WiMAX (e.g., an IEEE 802.16 standard), a radio-frequency ID (RFID) protocol, and/or other wireless communication protocols. Wired interfaces may include an Ethernet interface, a Universal Serial Bus (USB) interface, or similar interface to communicate using a wire, a twisted pair of wires, a coaxial cable, an optical link, a fiber-optic link, or other physical connection to a wireline network. In an example embodiment, the ground station 110 may communicate with the aerial vehicle 120, other landing stations, and/or other entities (e.g., a command center) using the communication system.

While not illustrated herein, it is contemplated that a length of tether 140 may be adjusted by a tether reel or another type of winding mechanism. The tether reel, which may be located between the ground station 110 and the aerial vehicle 120, can provide an adjustable and/or controllable working length for the tether 140. In other embodiments, tether 140 may have a fixed length.

In some embodiments, the aerial vehicle 120 can include landing gear or another type of structure suitable for stabilizing and/or anchoring the aerial vehicle 120 to a surface or a structure during non-flight operations. For example, the landing gear may include a gripper mechanism configured to couple the aerial vehicle 120 to a perch structure. In another example embodiment, the landing gear may include tires, legs, and/or skids. Yet further, the landing gear may be configured to engage with at least a portion (e.g., a landing perch) of the ground station 110 described below.

III. Example Aerial Vehicles

Figure 2A:
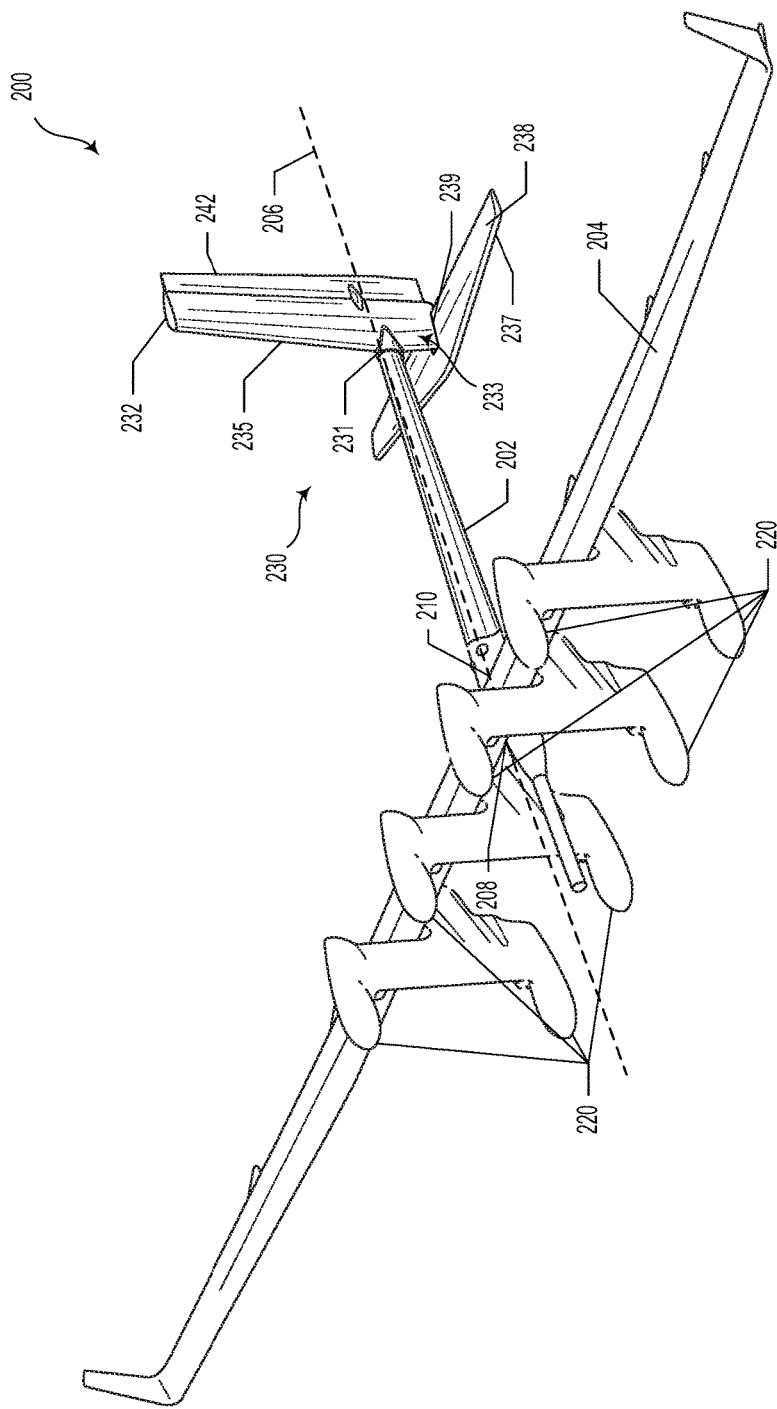
FIG. 2A illustrates an aerial vehicle, according to an example embodiment.
Figure 2B:
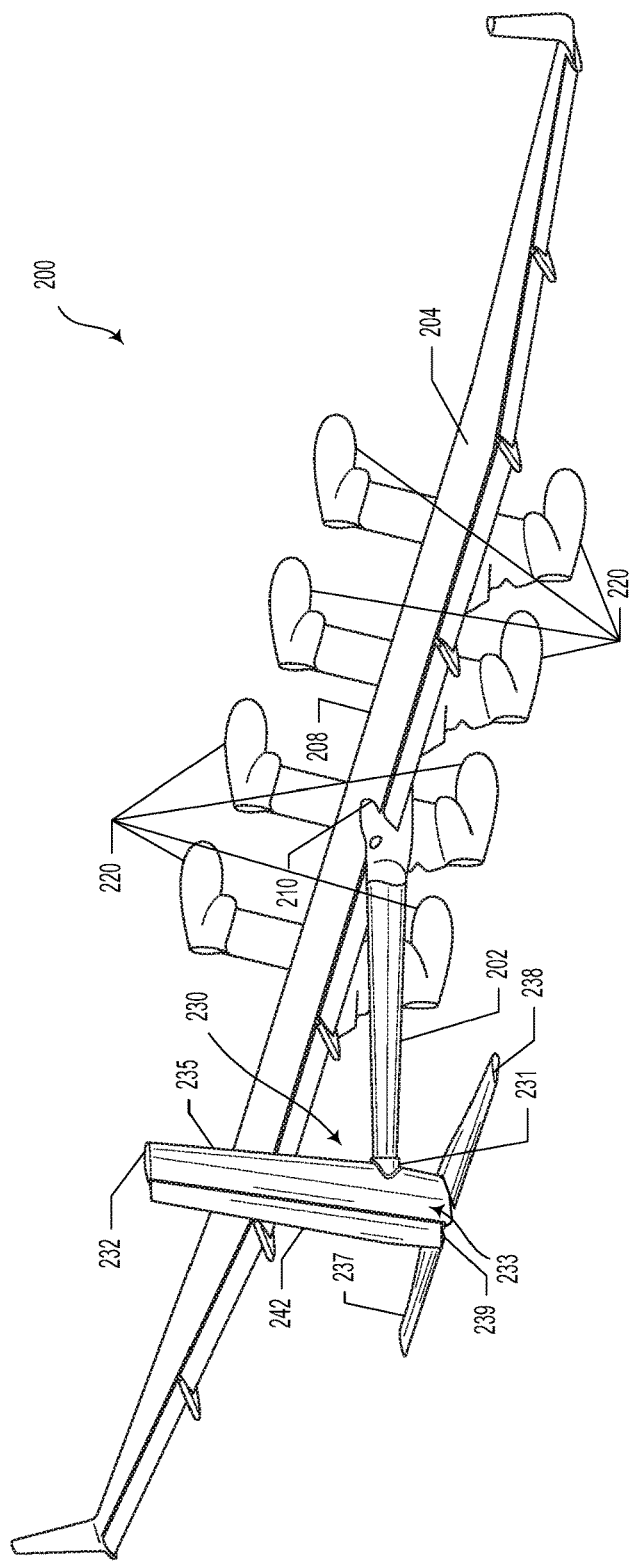
FIG. 2B illustrates an aerial vehicle, according to an example embodiment.

FIGS. 2A, 2B, 2C, 2D, 2E, 2F, and 2G illustrate an aerial vehicle 200, and various portions thereof, according to example embodiments. The aerial vehicle 200 may be similar or identical to the aerial vehicle 120 as illustrated and described with regard to FIG. 1. In FIGS. 2A and 2B, propellers have been omitted for clarity and ease of viewing.

In example embodiments, the aerial vehicle 200 is a wind energy kite. However, other types of aerial vehicles are possible and contemplated herein. The aerial vehicle 200 includes a fuselage 202. In some embodiments, the fuselage 202 may include a tail boom. The aerial vehicle 200 also includes a main wing 204 attached to the fuselage 202.

The aerial vehicle 200 includes a plurality of motors 220. For example, the aerial vehicle 200 may include eight motors 220. However, more or fewer motors 220 are contemplated. The motors 220 are attached to the main wing 204 (e.g., via a respective plurality of nacelles mounted along the main wing 204). The motors 220 are mechanically coupled to respective propellers, which are not illustrated here to improve clarity.

The aerial vehicle 200 includes an empennage 230 attached to the fuselage 202 via a tail coupling 231. The empennage 230 includes a vertical tailfin 232. At least a portion 233 of the vertical tailfin 232 extends below the tail coupling 231. In some embodiments, the vertical tailfin 232 may include a rudder control surface 242.

The empennage 230 also includes a tube 234 arranged along the leading edge 235 of the vertical tailfin 232 and below the tail coupling 231. In some embodiments, the tube 234 may be arranged below an axis of the tail boom 206. Yet further, the tube 234 may be arranged proximate to an intersection of a bottom surface of the vertical tailfin 232 and the leading edge 235 of the vertical tailfin 232. The empennage 230 also includes rotating actuators 236a and 236b. The rotating actuators 236a and 236b could include servo motors, stepper motors, or another type of rotational motor.

The empennage 230 also includes a horizontal tailplane 238. The horizontal tailplane 238 includes a continuous leading edge 237 and a cutout 239. In some embodiments, the horizontal tailplane 238 may include a stabilator (e.g., an all-moving horizontal control surface). Additionally or alternatively, the horizontal tailplane 238 may include an elevator portion (e.g., an elevator control surface). Yet further, the horizontal tailplane 238 may include at least one of a servo tab or an anti-servo tab.

The horizontal tailplane 238 is coupled to the empennage 230 via the tube 234. The one or more rotating actuators 236a and 236b are configured to rotate the horizontal tailplane 238 about an axis 241 of the tube 234. At least a portion of the vertical tailfin 232 is configured to pass through the cutout 239. In some embodiments, the cutout 239 may include an open slot in the horizontal tailplane 238. In some embodiments, the cutout 239 may be disposed along a centerline of the horizontal tailplane 238 and aft of the tube 234 and/or the continuous leading edge 237.

In some embodiments, the horizontal tailplane 238 may include a split stabilizer having a port portion and a starboard portion. In such scenarios, the port and starboard portions may be independently rotatable about the tube 234.

In some embodiments, the tube 234 is further arranged along a bottom location along the leading edge of the vertical tailfin 232. Alternatively, the tube 234 may be arranged at other locations along the portion 233 of the vertical tailfin 232 that is below the axis of the tail boom 206 of the aerial vehicle 200, below a leading edge of the main wing 204, below a trailing edge of the main wing 204, and/or below a centerline along a longitudinal axis (e.g., a forward axis) of the aerial vehicle 200. Furthermore, in some embodiments, the tube 234 may be formed from a plurality of bonded carbon fiber sheets. Additionally or alternatively, the tube 234 may be formed from other materials as contemplated herein.

In some embodiments, the aerial vehicle 200 may be configured to operate one or more operational modes. For example, the operational mode may include one of: a forward flight mode, a crosswind flight mode, or a hover mode. In an example embodiment, the respective motors 220 may be hybrid motors configured to generate electricity while the aerial vehicle 200 is operating in the crosswind or forward flight modes.

Figure 2C:
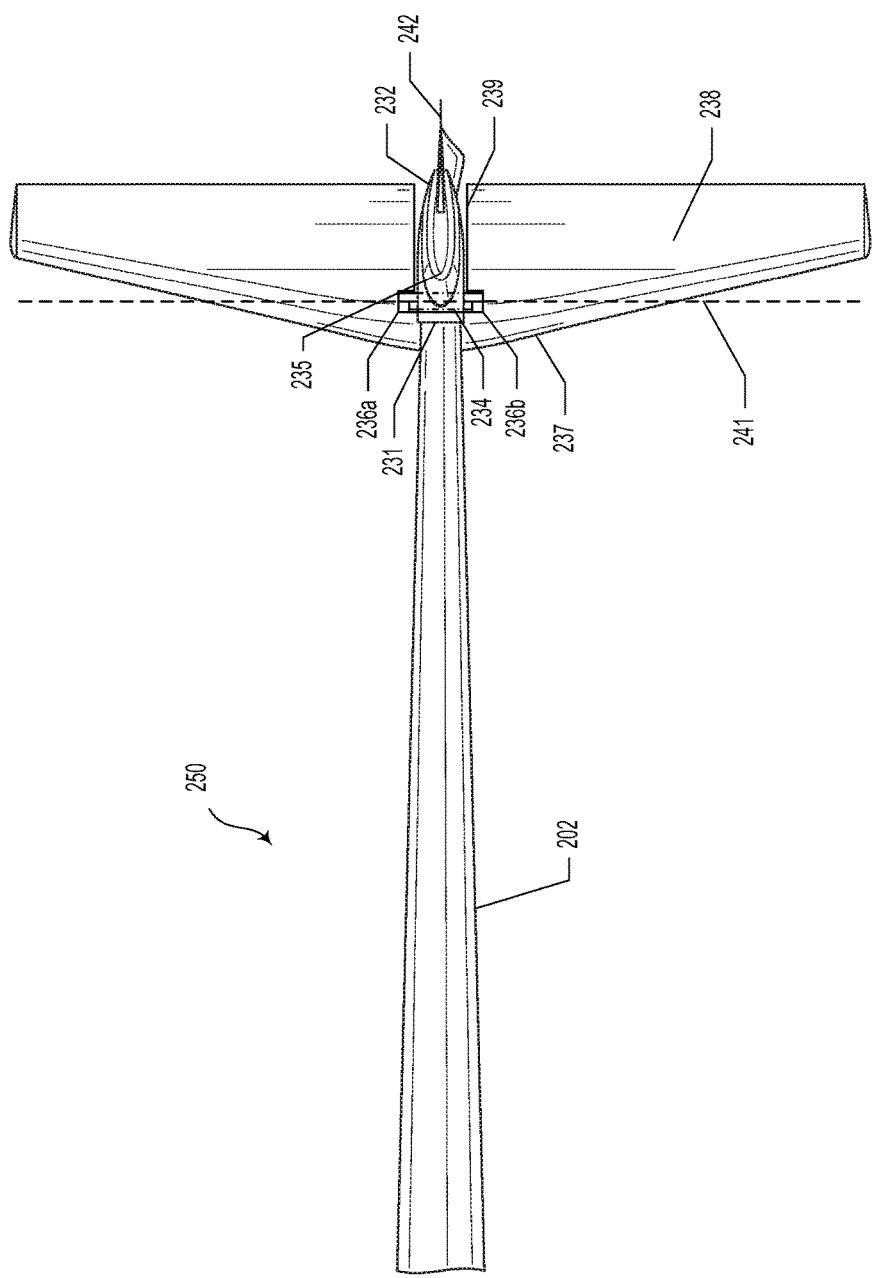
FIG. 2C illustrates a tail portion, according to an example embodiment.
Figure 2D:
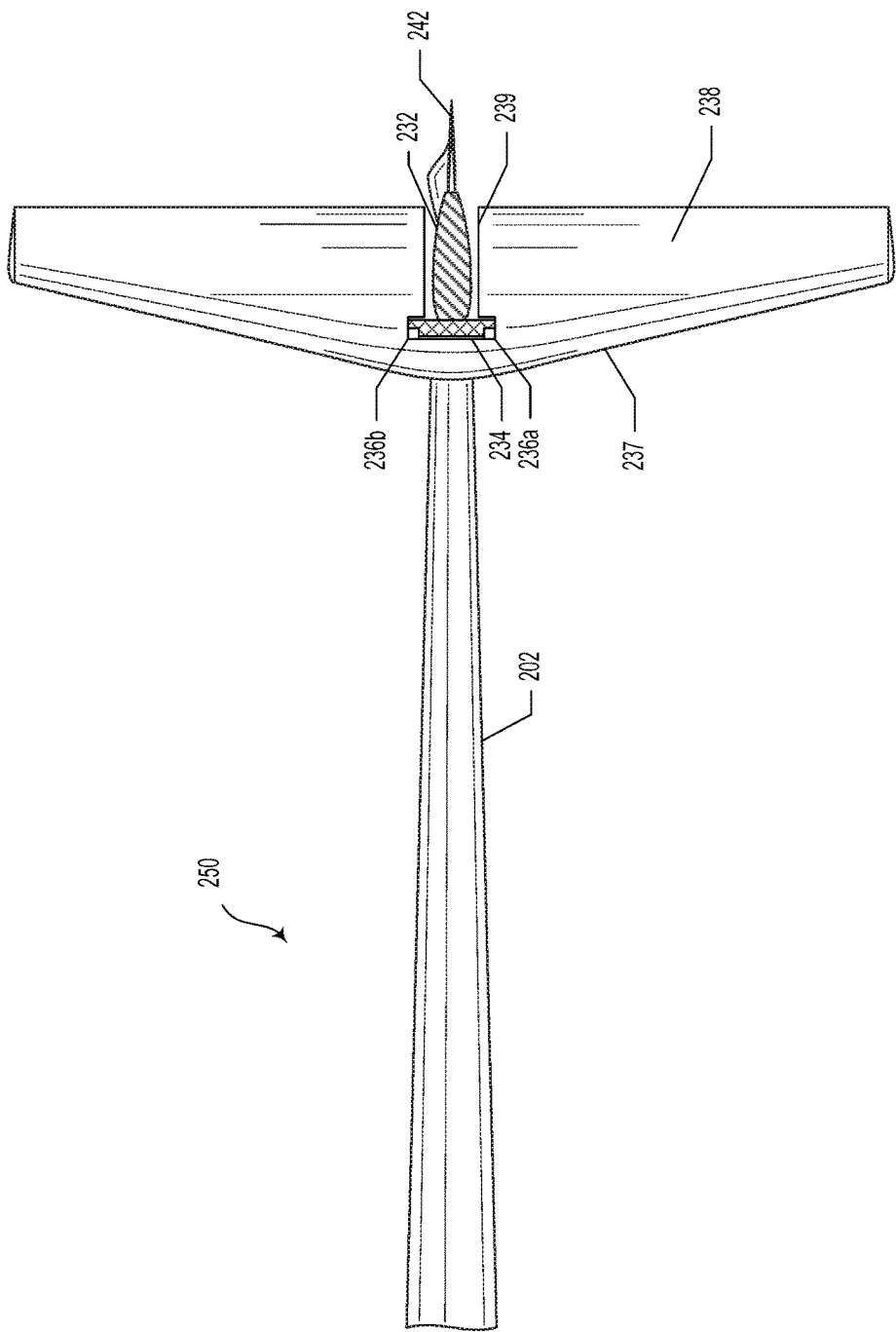
FIG. 2D illustrates a tail portion, according to an example embodiment.
Figure 2E:
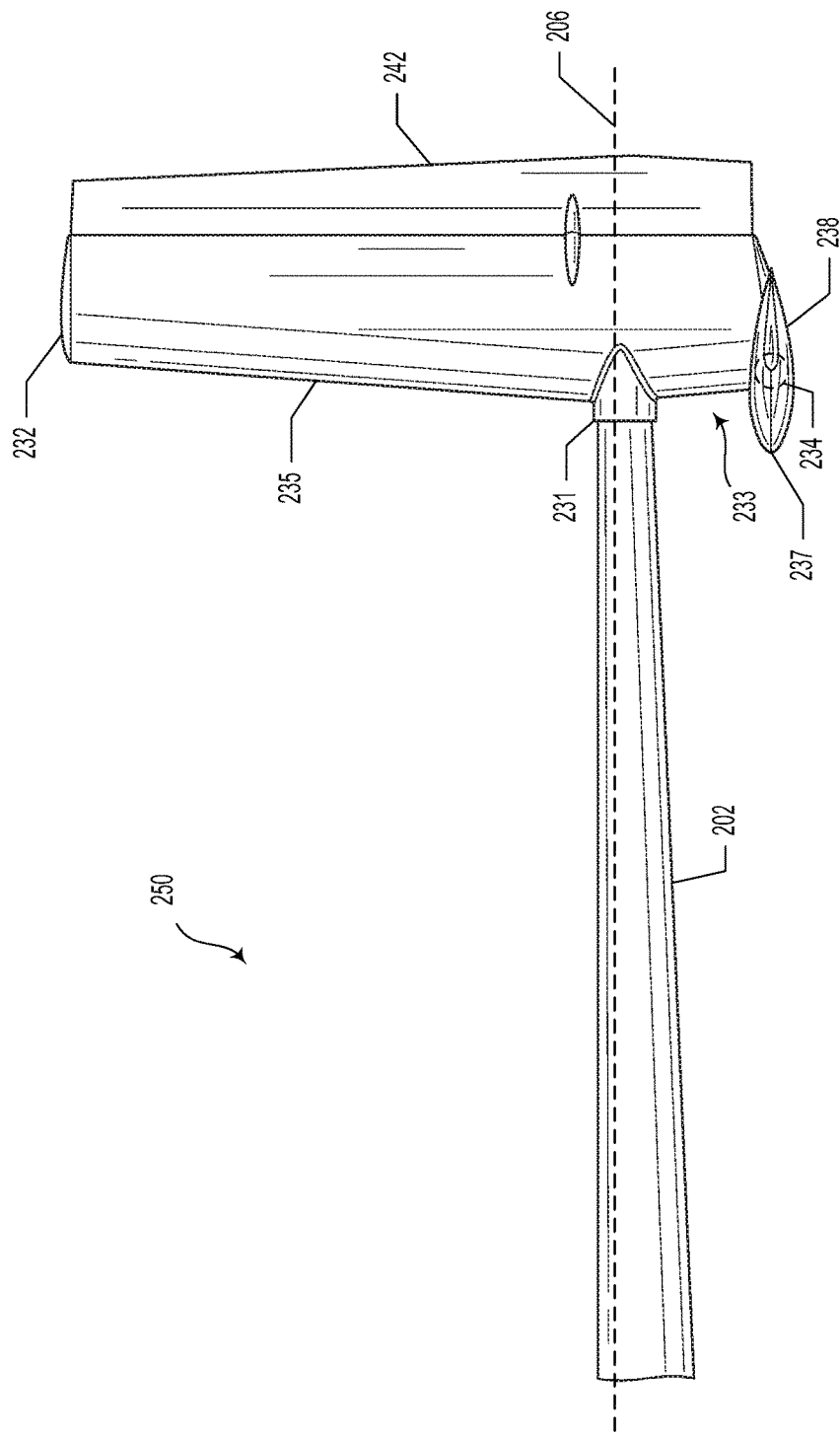
FIG. 2E illustrates a tail portion, according to an example embodiment.

FIG. 2C illustrates a top view of a tail portion 250, according to an example embodiment. FIG. 2D illustrates a bottom view of the tail portion 250, according to an example embodiment. FIG. 2E illustrates a left side view of the tail portion 250, according to an example embodiment.

FIG. 2F illustrates a left side view of a tail portion 260, according to an example embodiment. The tail portion 260 may include the horizontal tailplane 238 in a first alternative position (e.g., stabilator positioned in a downward orientation).

FIG. 2G illustrates a left side view of a tail portion 270, according to an example embodiment. The tail portion 270 may include the horizontal tailplane 238 in a second alternative position (e.g., stabilator positioned in an upward orientation).

Figure 3A:
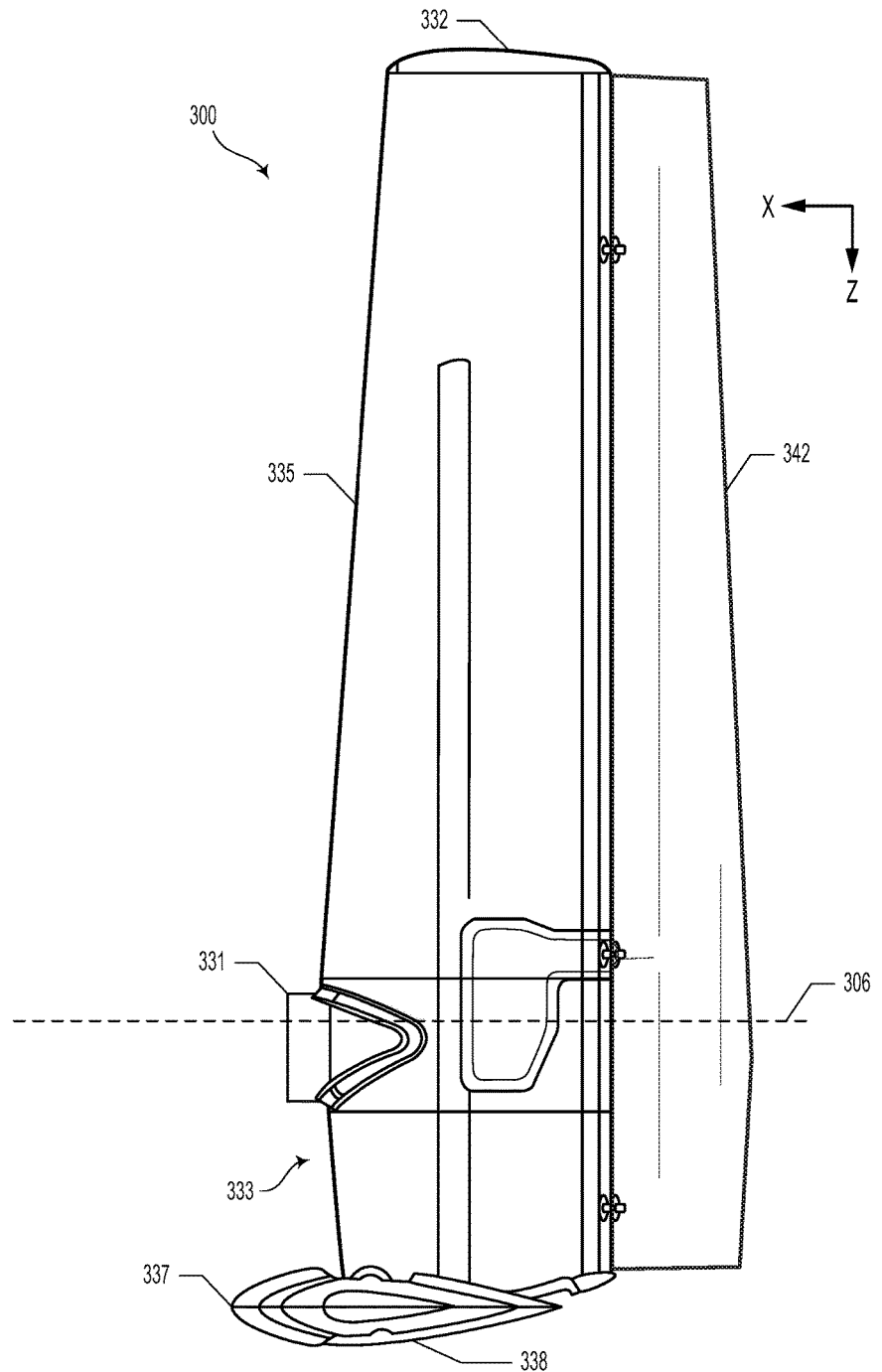
FIG. 3A illustrates a tail portion, according to an example embodiment.

FIGS. 3A-3D illustrate various views of tail portion 300, according to an example embodiment. For example, FIG. 3A illustrates a left side view of tail portion 300, FIG. 3B illustrates a front view of the tail portion 300, and FIG. 3C illustrates a top view of the tail portion 300. Tail portion 300 may be similar or identical to empennage 230, tail portion 250, and/or tail portion 260, as illustrated and described in reference to FIGS. 2A-2G. Tail portion 300 includes a vertical tailfin 332. At least a portion 333 of the vertical tailfin 332 extends below the tail coupling 331. In some embodiments, the vertical tailfin 332 may include a rudder control surface 342.

The tail portion 300 includes a tube 334 arranged proximate to a leading edge 335 of the vertical tailfin 332 and below the tailing coupling 331. In some embodiments, the tube 334 may be arranged below an axis of the tail boom 306. In some embodiments, the tube 334 may be arranged proximate to a junction between the leading edge 335 and a bottom edge 350 of the vertical tailfin 332. Yet further, the tube 334 may be arranged proximate to an intersection of a bottom surface 350 of the vertical tailfin 332 and the leading edge 335 of the vertical tailfin 332. The tail portion 300 also includes a horizontal tailplane 338. The horizontal tailplane 338 includes a continuous leading edge 337 and a cutout 339.

FIG. 3D illustrates a detailed top view of the tail portion 300, according to an example embodiment. As illustrated in FIG. 3D, the tail portion 300 also includes rotating actuators 336a and 336b. The rotating actuators 336a and 336b may provide rotational adjustment for the horizontal tailplane 338 about the tube 334. The rotating actuators 336a and 336b could include servo motors, stepper motors, or another type of rotational motor.

In some embodiments, as illustrated in FIGS. 3C and 3D, the horizontal tailplane 338 and the vertical tailfin 332 may be rotationally offset by about three degrees with respect to a vertical axis of the tail 300. For example, in aerial vehicles with a very small average turning radius it may be aerodynamically beneficial to rotationally offset the horizontal tailplane 338 in the direction of the average turn (e.g., counterclockwise between 1 and 5 degrees with respect to the vertical axis of the tail). Alternatively, some embodiments include no rotational offset between the horizontal tailplane 338 and the vertical tailfin 332.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
    a ground station;
    a tether; and
    an aerial vehicle, wherein the aerial vehicle is coupled to the ground station using the tether, wherein the aerial vehicle comprises:
        a fuselage;
        a main wing attached to the fuselage;
        a plurality of motors, wherein the motors are attached to the main wing, wherein the motors are mechanically coupled to respective propellers; and
        an empennage attached to the fuselage via a tail boom and a tail coupling, wherein the empennage comprises:
            a vertical tailfin, wherein at least a portion of the vertical tailfin extends below the tail coupling;
            a tube arranged along a leading edge of the vertical tailfin and below the tail coupling;
            one or more rotating actuators; and
            a horizontal tailplane, wherein the horizontal tailplane comprises a continuous leading edge and a cutout, wherein the horizontal tailplane is coupled to the empennage via the tube, wherein the one or more rotating actuators are configured to rotate the horizontal tailplane about an axis of the tube, wherein the cutout comprises an open slot in the horizontal tailplane, wherein at least a portion of the vertical tailfin is configured to pass through the cutout.

2. The system of claim 1, wherein the tube is further arranged proximate to an intersection of a bottom surface of the vertical tailfin and the leading edge of the vertical tailfin.

3. The system of claim 1 further comprising a controller configured to carry out operations, wherein the operations include:

causing the one or more rotating actuators to rotate the horizontal tailplane about the tube based at least on an operational mode of the aerial vehicle, wherein the operational mode comprises one of a forward flight mode or a hover mode.

4. The system of claim 3, wherein the respective motors comprise hybrid motors configured to generate electricity while the aerial vehicle is operating in the forward flight mode.

5. The system of claim 1, wherein the horizontal tailplane is a stabilator.

6. The system of claim 1, wherein the horizontal tailplane comprises an elevator portion.

7. The system of claim 1, wherein the horizontal tailplane comprises at least one of a servo tab or an anti-servo tab.

8. The system of claim 1, wherein the horizontal tailplane comprises a split stabilizer having a port portion and a starboard portion, wherein the port and starboard portions are independently rotatable about the tube.

9. The system of claim 1, wherein the aerial vehicle is a wind energy kite.

10. The system of claim 1, wherein the tube comprises a plurality of bonded carbon fiber sheets.

11. An aerial vehicle comprising:
a fuselage;
a main wing attached to the fuselage;
a plurality of motors, wherein the motors are attached to the main wing, wherein the motors are mechanically coupled to respective propellers; and
an empennage attached to the fuselage via a tail boom and a tail coupling, wherein the empennage comprises:
a vertical tailfin, wherein at least a portion of the vertical tailfin extends below the tail coupling;
a tube arranged along a leading edge of the vertical tailfin and below the tail coupling, wherein the tube comprises a plurality of bonded carbon fiber sheets;
one or more rotating actuators; and
a horizontal tailplane, wherein the horizontal tailplane comprises a continuous leading edge and a cutout, wherein the horizontal tailplane is coupled to the empennage via the tube, wherein the one or more rotating actuators are configured to rotate the horizontal tailplane about an axis of the tube, wherein the cutout comprises an open slot in the horizontal tailplane, and wherein at least a portion of the vertical tailfin is configured to pass through the cutout.

12. The aerial vehicle of claim 11, wherein the tube is further arranged proximate to an intersection of a bottom surface of the vertical tailfin and the leading edge of the vertical tailfin.

13. The aerial vehicle of claim 11, wherein the aerial vehicle is configured to operate an operational mode, wherein the operational mode comprises one of a forward flight mode or a hover mode.

14. The aerial vehicle of claim 13, wherein the respective motors comprise hybrid motors configured to generate electricity while the aerial vehicle is operating in the forward flight mode.

15. The aerial vehicle of claim 11, wherein the horizontal tailplane is a stabilator.

16. The aerial vehicle of claim 11, wherein the horizontal tailplane comprises an elevator portion.

17. The aerial vehicle of claim 11, wherein the horizontal tailplane comprises at least one of a servo tab or an anti-servo tab.

18. The aerial vehicle of claim 11, wherein the horizontal tailplane comprises a split stabilizer having a port portion and a starboard portion, wherein the port and starboard portions are independently rotatable about the tube.

19. The aerial vehicle of claim 11, wherein the aerial vehicle is a wind energy kite.

20. The aerial vehicle of claim 11, wherein the horizontal tailplane is coupled to the tube via the one or more rotating actuators, wherein the one or more rotating actuators comprise servo motors, wherein the cutout is disposed along a centerline of the horizontal tailplane and aft of the continuous leading edge.

* * * * *